Figure 1:
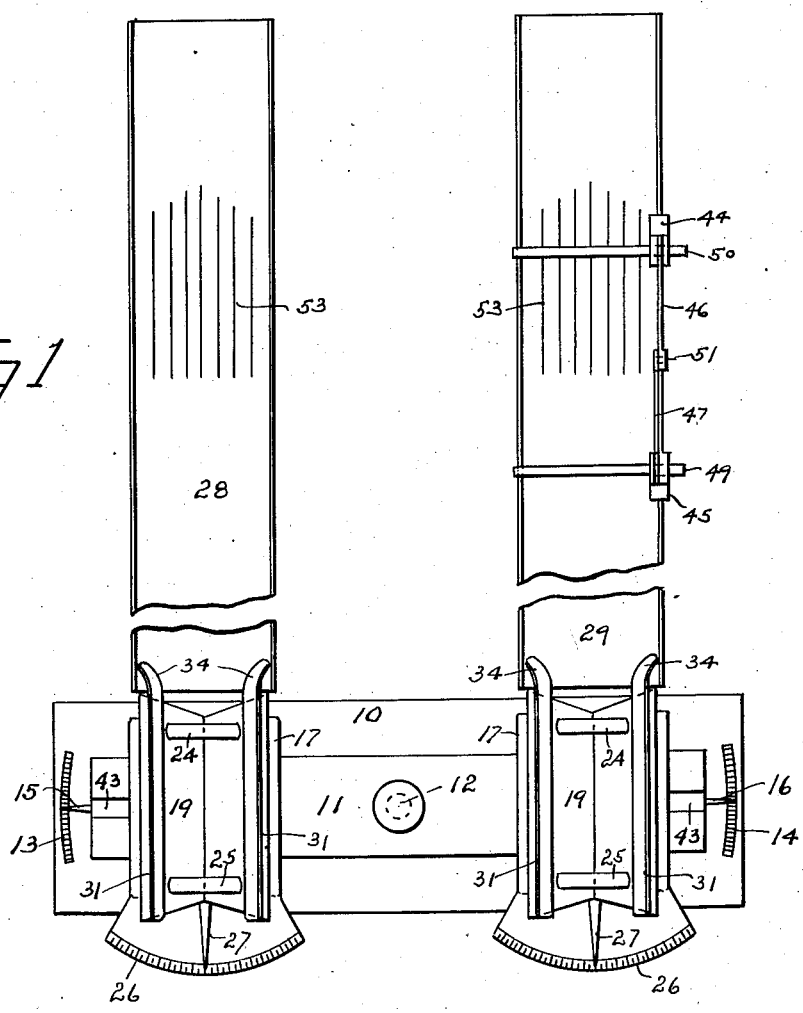

July 25, 1939.  O. HAUCKE  2,167,361

WHEEL AND CHASSIS ALIGNMENT INDICATOR

Filed March 31, 1934  2 Sheets-Sheet 1

INVENTOR.
Oswin Haucke
Henrik J. Schmidt
ATTORNEY

July 25, 1939.  O. HAUCKE  2,167,361
WHEEL AND CHASSIS ALIGNMENT INDICATOR
Filed March 31, 1934   2 Sheets-Sheet 2
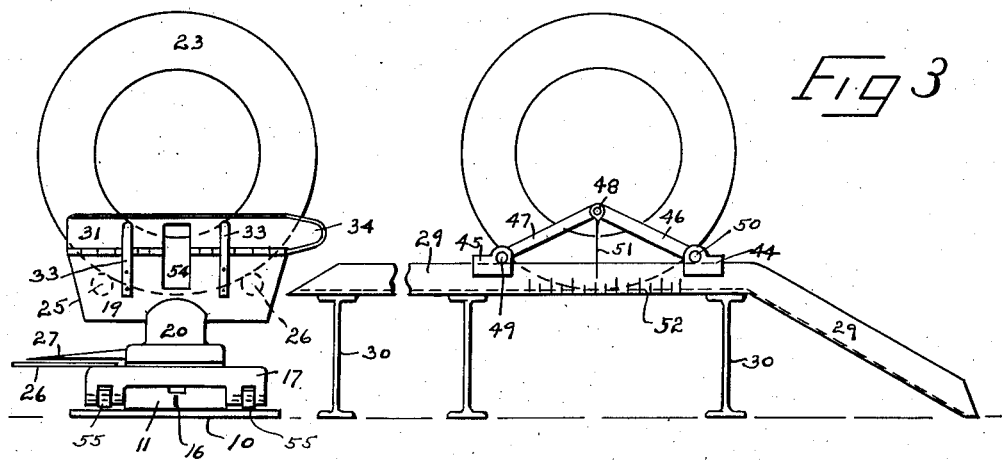
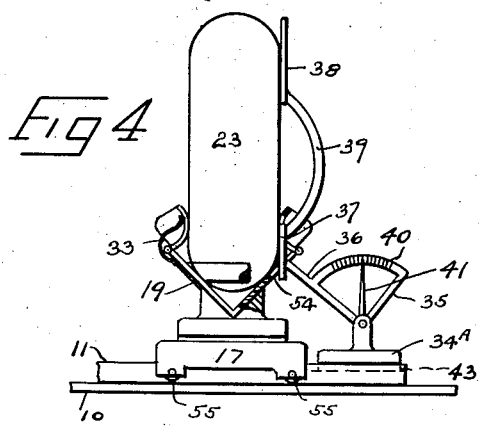
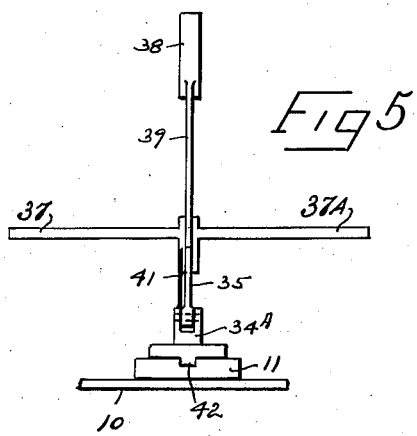
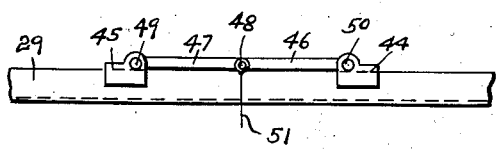
INVENTOR.
Oswin Haucke
BY
ATTORNEY Patented July 25, 1939

2,167,361

UNITED STATES PATENT OFFICE 2,167,361

WHEEL AND CHASSIS ALIGNMENT INDICATOR

Oswin Haucke, Brooklyn, N. Y.

Application March 31, 1934, Serial No. 718,369

22 Claims. (Cl. 33—203)

The invention relates to a device for checking the alignments of the wheels and chassis of a vehicle, and more particularly of an automotive vehicle. It has for one of its main objects to provide a device by means of which all the various alignments of the wheels and the chassis of an automobile may be checked simultaneously. Another object is to so construct the device that the steering-gear mechanism of the automobile may likewise be tested for inaccuracies in adjustment or alignment.

A further object is to provide the device with scales by means of which each individual aligning test will be readily indicated to show with accuracy the degree or amount of misalignment. A still further object is to provide a device adapted to be used on automobiles of all makes and sizes.

Additional objects are to provide a device of simple and strong construction, which requires no exceptional skill to operate, which will effect a great saving in both time and labor, and which can be manufactured and installed at a comparatively low price.

This and various other objects and advantages will be readily understood from the following description and from the accompanying drawings of a preferred embodiment of the invention in which, however, modifications may be made without departing from the scope of the invention.

In the drawings

Figure 2:
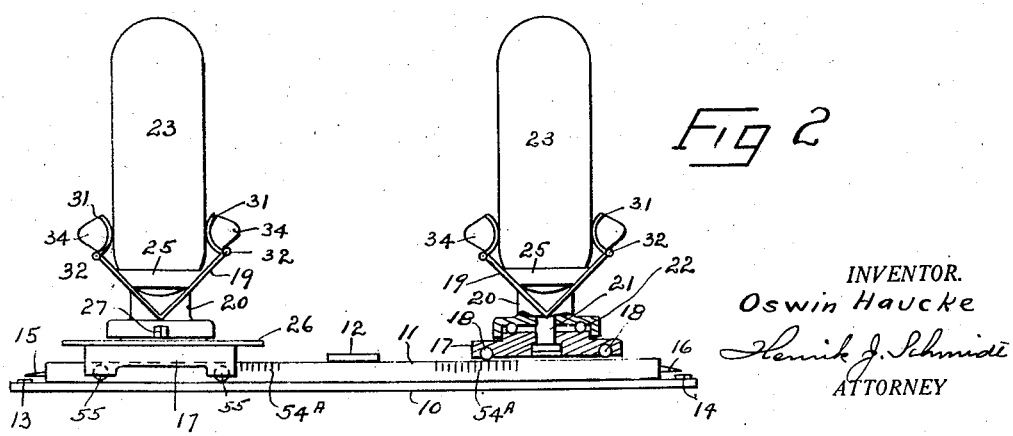

Fig. 1 is a plan view of the invention,

Fig. 2 a front view with certain parts shown in cross-sections,

Fig. 3 a side elevation,

Fig. 4 a fragmental part of the device showing certain parts,

Fig. 5 a side view of one of the parts shown in Fig. 4, and

Fig. 6 a side view of a certain other part used in the device.

Referring now to Figs. 1, 2 and 3, the device consists of a base 10 on which a beam 11 is mounted on a stud 12. The beam is free to rotate on the stud and is supported on rollers or other anti-friction means to facilitate its turning. Scales 13 and 14 are mounted on the base and pointers 15 and 16 are secured on the ends of the beam. By these means any rotation of the beam is plainly indicated.

Two carriages 17 are mounted on the beam and are free to slide along it on rollers 18 which engage on its top face. On top of each carriage, a wheel cradle 19 is mounted on a base 20. The base 20 is rotatingly mounted on the carriage by means of a stud 21. The joint between the two parts is preferably provided with a roller bearing, as shown at 22.

The cradles 19 are formed in the shape of a V in which the wheel 23 of an automobile will center itself. Two rods 24 and 25 extend across the cradle so as to center the wheel lengthwise with the cradle. A scale 26 is mounted on each of the carriages 17 and a pointer 27 is mounted on each of the cradle bases 20. By means of these any rotation of the cradles in relation to the beam 11 is plainly indicated. A pair of runways 28 and 29 are mounted in rear of the cradles on beams 30. The rear end of the runways are inclined so that a car may easily be driven up on them, and their height is approximately the same as the height which the front wheels will assume when resting in the cradles.

In some instances, I prefer to hinge a pair of leaves 31 to the upper edges of each cradle so as to further assure the correct centering of the wheels in the cradles. These leaves are hinged at 32 and springs 33 (shown in Figs. 3 and 4) tend to force them against the wheels. Their rear ends 34 are flared outwardly to facilitate the entering of the wheels in the cradles.

To test the camber angle of the front wheels a gage is used which consists of a base 34A in which a sector 35 is pivotally mounted. One arm 36 of the sector is extended and this arm supports a straight edge which has two contact surfaces 37 and 38 connected by a curved handle member 39. A scale 40 is provided on the sector and a pointer 41 is secured on the base 34A. The base 34A is provided with a tongue 42 which engages in a groove 43 milled in the beam 11.

To ascertain the parallelism of the front and the rear axles, the gage shown in Figs. 1, 3 and 6 is employed. This gage consists of two shoes 44 and 45 which are bifurcated and slidingly mounted on the edge of the runway. Two arms 46 and 47 are pivoted at 48 and also pivoted to the shoes by means of rods 49 and 50. These rods are slidingly mounted in the shoes. A depending pointer 51 is pivoted in the center to the two arms and a scale 52 is mounted on the edge of the runways.

The device is used in the following manner. The automobile is driven over the runways until the front wheels rest in the cradles 19. As previously said, the cradles are movable along the beam so that automobiles having different wheel distances may be accommodated. Scales 53 are impressed lengthwise in the runways so that the exact center position of the rear wheels and their distances apart may be ascertained. Scales 54A are likewise impressed in the front face of the beam 11 and these scales are read by means of the edges of the carriages 17. By means of these two sets of scales it may at once be ascertained whether or not the distances between the front wheels and the rear wheels are the same.

The "toe-in" of the wheels may at once be checked by the reading of the pointer 27 on the scale 26. These scales will indicate whether the proper amount of "toe-in" exists and whether both front wheels "toe-in" the same amount.

If the steering wheel is now turned the steering mechanism may be tested. The scales 26 indicating the rotation of the front wheels and the scales 13 and 14 indicating the movement of the wheels as the beam 11 is rotated.

To ascertain whether or not the front wheel has the correct camber, the gage shown in Figs. 4 and 5 is employed. The engaging surfaces 37 and 38 are pressed against the side of the front wheel, as plainly shown in Fig. 4, and the angle of the wheel is read on the scale 40. To enable the part 37 to engage with the wheel, a slot 54 (see Fig. 4) is cut in the side of each of the cradles and in the leaves 31.

To ascertain if the distance between the right front and rear wheel and the left front and rear wheel is the same, or in other words if the axles are parallel, the device shown in Figs. 1, 2 and 5 is employed. The rods 97 and 98 which have been drawn sidewardly while the car was driven up on the runways, are now pushed back across the runways and the shoes 99 and 100, which are connected by links 101 and 102, are pushed together until the rods engage with the wheel. The depending pointer 103 will indicate on the scale 104 the distance between the center of the front wheel and the center of the rear wheel. When a similar measurement is taken on the other side of the automobile, the parallelism of the axles is checked. Of course, during this operation the beam 11 will have to be in its normal or rectangular position to the runways.

To relieve the strain on the rollers 18 and to prevent tipping of the carriages 17 a plurality of small wheels 55 may be employed. These wheels engage against the beam 10 while the front wheels are being driven into the cradles.

From the foregoing it will be seen that this device affords a simple but accurate means for checking the wheels and chassis of any automobile and that this work may be performed by anyone without any great effort or much expenditure of time.

The following is a clear description of its operation and functions:

The device is placed on a base 10 of hard concrete floor or other suitable floor which is solid and level, care must be taken that the front structure and runways are absolutely level and at right angles otherwise the readings of the various scales, which rely upon each other, are incorrect or approximate only. With the structure level and at right angles the readings taken will be absolutely correct. This has been proven by the device in operation in the last four years.

A vehicle is driven upon the runways with the front wheels resting in the wheel-centering cradles 10. Those cradles automatically center the wheel as to diameter and width of tire. The cradles 19 and carriages 17 are freely movable laterally on intermediate base 11 or the beam and adjust themselves automatically to the tread of the front wheels or track. The vehicle is moved by slight pressure by hand until the scales 54a and the intermediate base or beam 11 read alike. This reading gives the tread of the front axle, also places the front axle in center position as to structure.

The rear axle is now centered by comparing the scales 53, impressed lengthwise on runways, with the inner side of rear tires; the readings should be alike, if not a rolling jack is placed under the rear axle and the rear end shifted until the readings are equal. This places the rear axle in an exact center position, gives the tread of the rear axle and places the vehicle in an exact parallel position in relation to the structure.

A holding device such as described in application Serial No. 4,489, Patent No. 2,025,051, should be employed to keep the front axle in center position if the steering mechanism is operated. The brakes should be in a released position during the operation. This is necessary as the weight of the vehicle presses and adjusts the front structure as to its natural position in relation to the vehicle, then as to the relative movement of beam 11 and the lateral and rotative movement of carriage 17, no binding is possible.

With the vehicle front and rear axles centered as to structure the readings of the various scales can simultaneously be taken as fast as you may want to read them. The track of front wheel is indicated by scales 54a. The center of front wheel by pointers 15, 16 and scales 13, 14. The track of rear wheel is indicated by scales 53; the toe-in of front wheel by pointers 27 and scales 26; the parallelism of front axle by pointers 15 and 16 and scales 13 and 14. The parallelism of the rear axle is ascertained by positioning rear wheel centering device shoes 44 and 45, pressing them against the tire, and thru the outer flange of runway pointer 51 will point out the center of the rear wheels and indicate same on scales 52 on the side of the runway which indicates the wheel base; by comparing the wheel base of right and left side the parallelism of rear axle is ascertained; a tolerance of ⅛" is permissible as to correctness. A greater variation will indicate such conditions as variation in spring center due to shifted axle or settled springs, distorted chassis in a horizontal plane due to collision, or bended axle housing. To check for bended rear axle housing, a six-foot long straight edge is placed on top of arms 44 and 45 and pressed against tire of wheel. The parallelism of the straight edge as to runway scales 53 compared; if the housing is bended, one wheel will indicate straight the other wheel at an angle inward or outward according to the nature of the bend, if the trouble is due to other causes both sides will indicate an off-parallel position. The camber angle of rear wheel may be checked by using camber gauge, Fig. 5, although this check is not important and is only necessary on a minor percentage of vehicles tested. (All the above-mentioned measurements covering the complete rear-axle alignments are made possible with a structure as disclosed in the application or as shown in my Patent No. 2,090,294.) To check the camber angle of front wheels the three-contact-point gauge in Fig. 5 is employed. This gauge is placed on top of intermediate base in slot provided on lower center of carriage, contact-point arms 37, 37a and 38 are pressed against tire and the camber angle can be read direct by pointer 41 on scale 40. This test only takes a few seconds, is simple and no skill is required.

This camber gauge gives a correct camber reading due to the base being level and the contact surface 37, 37a of the straight edge are 7 inch or more above the road-contact point or bulge of tire and contact point 38 in center and upper outer surface of tire. This is a very important item as to correct camber reading; with a 2-contact-point straight edge type gauge due to the bulge in tire which is with the average automobile approximate ¼", which equals 1 degree on the average wheel diameter which is the average maximum for camber on present automobiles. It can readily be seen why a 2-point contact straight edge type camber gauge is incorrect for gauging camber angle. Manufacturers of this type gauge specify to make allowance for tire bulge, which means to get correct measurements with their gauges the user should measure the bulge in order to get the difference, and set the upper edge some distance away from the tire, a procedure impractical. A three point camber gauge to be used intermediately is clearly shown in my Patent 2,090,294, Serial No. 108,921.

To check the caster angle precaution should be taken as to scales 54a which should read equal as to tread or track of front axle. The same scale is used to read caster angle. Scales 54a are graduated to ½" and ⅛" graduation, the ½" scale is the track scale, read 56, 57, 58 and so forth, the ⅛" scale is the caster-angle scale also kingpin inclination scale, can be read in inches or degrees. ⅛" equal to one degree.

A sliding stop or indicator is loosely mounted on the beam 11 over scales 54a. This stop is pushed against the edge of carriage 17 with the wheels in straight-ahead position or when the pointer 27 reads zero on the scales 26. The steering wheel now is turned left until the pointer 27 reads 20° on scales 26 of the left-hand wheel. The action of changing the steering position causes the intermediate base 11 to revolve and move backward a certain distance at its ends pointed out by pointer 15 and scale 13, the carriage 27 automatically moves inward or laterally a certain distance according to the amount of king-pin inclination, for illustration purposes ⅜ inch or three degrees. This is read on scale 54a and equals the distance between stop and edge of carriage 17. After reading is taken the steering wheel is turned right until pointer 27 reads 20 degrees right hand turn on scale 26. The action of turning the steering wheel right causes the intermediate base 11 to turn and its end to move forward a certain distance pointed out by pointer 15 and scale 13 and at the same time the carriage 17 will slide back to zero and again move a certain distance inward or laterally according to the amount of king-pin inclination. Again the distance between the scale stop and edge of the carriage equals ⅜" or three degrees; by adding the distance of the two movements, the result is king-pin inclination. In this case the king-pin inclination equals ¾" or 6 degrees.

Due to the equal movements of carriage no caster angle exists. The king-pin is absolutely at right angles in relation to the structure. If the king-pin is tilted backward to positive or forward to negative, the amount of tilt or caster will be indicated in the difference of the two movements of the carriage 17. For instance the king-pin inclination equals 6 degrees or ¾" carriage movement left turn, and ⅜ inch carriage movement right turn. No caster exists now if the carriage movement on left turn changes to ½" or 4 degrees and on right turn to ¼ inch or 2 degrees which indicates a positive caster angle of ⅝" or 2 degrees. If the carriage movement on right turn equals ⅝" or 5 degrees and on left turn ⅛ or 1 degree which indicates a negative caster angle of 4 degrees.

The same proceedings are taken on right hand wheel and compared against the reading of left side; if they are equal to each other the kingpin inclination and caster angle on both sides are the same, if not equal corrections should be made on the axle until the readings are alike and correspond to specification. The time required to take king-pin inclination and caster angles is less than 5 minutes. You may take them as fast as you want to read them. The camber angle may be calculated by the amount of carriage 17 movement on scale 54a and intermediate base or beam 11 movement on scale 13, 14, although I prefer using gauge (Figs. 4 and 5) for a quick check.

If there exist conditions as to bended front axle or shifted front springs the intermediate base 11 will not be at zero pointed out by pointers 15, 16 on scales 13, 14. The distance off zero equals the amount of bend or "out of parallel" and can be detected at a glance. In most cases the backward side of intermediate base is the bended or shifted side. Correction is made with the vehicle on the device and can be done in a very short time due to no complication in taking readings. All that is required is the turning of the steering wheel right or left and the readings are automatically and simultaneously indicated. To check the front wheels as to straight ahead position in relation to center point of steering center cam position, the pointer 27 is set on scale 26 ½ to 1 degree inward, according to toe-in, the steering wheel zero position which in most vehicles is marked on lower part of spoke should be straight in direction of vehicle. This is an important check; if incorrect the high point of cam would be off center, which causes lost motion while the vehicle is traveling straight ahead and the driver has improper control of the front end, this check is made in a few seconds. Toe-out and turning radius can easily be checked by pointer 27 and protractor scale 26.

Due to the construction and its functional action the results will be absolutely correct and always the same regardless of how many times a vehicle is put through the test unless the vehicle has been distorted and then the amount of distortion is plainly indicated by the device.

While I have shown an elevated runway, it is evident that this may be dispensed with and that the beam and the cradles may be set in a pit, so as to bring the cradles even with the surface of the floor.

Having described my invention and its objects, what I claim as new is:

1. In a device of the class described, a base plate, a beam rotatably mounted on said base plate, a pair of rotatably-mounted cradles slidably mounted on said beam, means associated with said cradles for centering the wheels of a vehicle therein, means for indicating the amount and direction of rotation of the cradles caused by the insertion of said wheels, and means for simultaneously indicating the amount and direction of rotation of the said beam.

2. In a device of the class described, a base plate, a beam rotatably mounted on said base plate, a pair of rotatably-mounted cradles slidably mounted on said beam, means associated with said cradles for centering the front wheels of a vehicle therein, the said cradles and beam being rotatable by the steering-gear mechanism of such vehicle, means for indicating the amount of rotation imparted to the said beam, and means for separately indicating the amount of rotation imparted to each of the cradles.

3. In a device of the class described, a base plate, a beam rotatably mounted on said base plate, a pair of rotatably-mounted cradles slidably mounted on said beam, means associated with said cradles for centering the wheels of a vehicle therein, means for indicating the amount and direction of rotation of the cradles caused by the insertion of said wheels, and means for simultaneously indicating the amount and direction of rotation of the said beam, a pair of runways for guiding the wheels into the cradles, and indicator scales provided on said runways and on the said beam for correctly indicating the centers of all the wheels of the vehicle.

4. In a device of the class described, a base plate, a beam rotatably mounted on said base plate, a pair of rotatably-mounted cradles slidably mounted on said beam, means associated with said cradles for centering the wheels of a vehicle therein, means for indicating the amount and direction of rotation of the cradles caused by the insertion of said wheels, and means for simultaneously indicating the amount and direction of rotation of the said beam, a pair of runways for guiding the wheels into the cradles, indicator scales provided on said runways and on the said beam for correctly indicating the centers of all the wheels of the vehicle, and indicating means associated with said runways for testing the parallelism of the front and rear axles of the vehicle.

5. A gauge for the purpose indicated comprising a supporting base, a wheel supporting table operatively connected thereto and mounted thereon for motion in any horizontal direction and for rotation, means for indicating the amount of rotational movement of said table, said table having upon its upper face substantially parallel upwardly extending projections for causing a wheel resting on the table to assume a definite position with relation thereto, and a pair of transverse bars between said projections for engaging opposite sides of the periphery of an automobile tire for centering the wheel on said table.

6. A gauge for the purpose indicated comprising a supporting base, an element having a length substantially equal to the width of an automobile and mounted for rotation on said base, and a pair of wheel-supporting tables operatively connected to the base, one table near each end of the element, and mounted on said element for motion horizontally along the element, and means for indicating the amount of rotational movement of said tables.

7. A gauge for the purpose indicated comprising a supporting base, a beam having a length substantially equal to the width of an automobile and mounted for rotation on said base, a pair of wheel-supporting tables operatively connected to the beam, one table near each end of the beam, and mounted on said beam for motion horizontally along the beam, means for indicating the amount of rotational movement of said tables, and means for indicating the amount of rotational movement of said beam.

8. A gauge for the purpose indicated comprising a supporting base, a wheel supporting table operatively connected thereto and mounted thereon for motion in any horizontal direction and for rotation, means for indicating the amount of rotational movement of said table, said table having upon its upper face substantially parallel upwardly extending projections for causing a wheel resting on the table to assume a definite position with relation thereto, said projections being hingedly mounted on the table, and springs normally tending to press said projections toward each other for engaging an automobile wheel.

9. A gauge for the purpose indicated comprising a supporting base, a pair of transversely disposed wheel-supporting tables operatively connected thereto and mounted thereon for motion in any horizontal direction and for rotation, means for indicating the amount of rotational movement of said tables, each table having upon its upper face substantially parallel upwardly extending projections for causing a wheel resting on the table to assume a definite position with relation thereto, a runway, and means for centering an automobile on said runway with reference to said tables.

10. A gauge for the purpose indicated comprising a supporting base, a wheel supporting table operatively connected thereto and mounted thereon for motion in any horizontal direction and for rotation, means for indicating the amount of rotational movement of said table, said table having upon its upper face substantially parallel upwardly extending projections for causing a wheel resting on the table to assume a definite position with relation thereto, and a runway, means for aligning the rear axle of an automobile at right angles to said projections, and means for determining the alignment of the rear axles of said automobile.

11. In a device of the class described, a base, a beam rotatably mounted on said base, a pair of rotatably mounted cradles mounted on opposite ends of said beam, means associated with said cradles for centering the wheels of an automobile therein, and means for indicating the amount of direction of rotation caused to the cradles by the insertion of said wheels.

12. In a device of the class described, a base plate, a beam rotatingly mounted on said base plate, a pair of rotatingly-mounted cradles slidingly mounted on said beam, means associated with said cradles for centering the wheels of a vehicle therein, means for indicating the amount and direction of rotation caused to the cradles by the insertion of said wheels, and means for simultaneously indicating the amount and direction of rotation caused to the said beam, a pair of runways for guiding the wheels into the cradles, indicator scales provided on the side and upper face of each of said runways and on the said beam for correctly locating the centers of all the wheels of the vehicle, and indicating means mounted on said runways for testing the parallelism of the front and rear axles of the vehicle.

13. A gauge for the purpose indicated comprising a supporting base, a wheel supporting table operatively connected thereto and mounted thereon for motion in any horizontal direction and for rotation, means for indicating the amount of rotational movement of said table, said table having upon its upper face substantially parallel upwardly extending projections for causing a wheel resting on the table to assume a definite position with relation thereto, said projections forming substantially a V in cross-section and being hingedly mounted at the lower edges on the table, and springs tending to press said projections toward each other.

14. An automobile wheel gauge for the purpose indicated comprising a supporting base, a beam rotatably mounted on said base and extending a distance substantially equal to that of the width of an automobile, a pair of wheel centering devices mounted on opposite ends of said beam, and means for permitting sliding horizontal motion of said wheel-supporting device on said beam.

15. A gauge for the purpose indicated comprising a supporting base, a wheel-supporting element operatively connected thereto for motion in any horizontal direction and for rotation, and means indicating the center of the diameter of the wheel and means indicating the center of the width of the wheel.

16. A gauge for the purpose indicated comprising a supporting base, a wheel-supporting element operatively connected thereto for motion in any horizontal direction and for rotation, a runway connected with the supporting base, and indicating means on said runway to indicate the center of a wheel resting thereon as to the diameter of the tire and as to the width of the tire.

17. A gauge for the purpose indicated comprising a supporting base, a pair of transversely disposed wheel-supporting elements connected with the supporting base, each element being rotatably mounted, and a runway connected with each element, the runways being parallel and the same distance apart as the elements.

18. A gauge for the purpose indicated comprising a supporting base, a pair of transversely disposed wheel-supporting elements connected with the supporting base, each element being rotatably mounted, and a runway connected with each element, the runways being parallel and the same distance apart as the elements and having inclined tracks at the opposite ends.

19. A gauge for the purpose indicated comprising a wheel-supporting element, a runway connected to said wheel supporting element, and means associated with said runway to indicate the position of a wheel resting thereon as to the center of the diameter of the tire and the center of the width of the tire.

20. A gauge for the purpose indicated comprising a pair of transversely disposed wheel supporting elements, means for centering a pair of wheels resting thereon, means for indicating the positions of the centers of the wheels, a pair of runways connected to said pair of transversely-disposed wheel-supporting elements, said pair of runways being raised, means associated with said runways to indicate the position of a wheel or a pair of wheels resting thereon as to central location.

21. A gauge for the purpose indicated comprising a supporting base, a wheel-supporting element operatively connected thereto for motion in any horizontal direction and for rotation, and means associated therewith for indicating the center of the diameter of the wheel.

22. A gauge for the purpose indicated comprising a supporting base, a wheel-supporting element operatively connected thereto for motion in any horizontal direction and for rotation, a runway connected with the supporting base, and a manually controlled wheel-center indicating device, having a part mounted on the runway, a part for contacting the wheel, and a part for indicating the center of the diameter of the wheel.

OSWIN HAUCKE.